United States Patent [19]
Kent

[11] Patent Number: 6,101,755
[45] Date of Patent: Aug. 15, 2000

[54] FISHING RIG AND METHOD

[76] Inventor: Wayne Kent, P.O. Box 6162, Tyler, Tex. 75711

[21] Appl. No.: 09/004,888

[22] Filed: Jan. 9, 1998

Related U.S. Application Data

[60] Provisional application No. 60/036,982, Jan. 30, 1997.

[51] Int. Cl.[7] .................................................. A01K 91/14
[52] U.S. Cl. ........................ 43/4.5; 43/44.83; 43/44.98; 359/885
[58] Field of Search ................... 43/17.5, 44.83, 43/44.98, 4.5, 43.1, 44.84, 44.86; 428/394, 395; 359/885, 589

[56] References Cited

U.S. PATENT DOCUMENTS

| | | | |
|---|---|---|---|
| 2,911,753 | 11/1959 | Beckett | 43/44.83 |
| 3,327,423 | 6/1967 | Kotis | 43/44.83 |
| 3,368,299 | 2/1968 | Scheidt, Jr. | 43/44.83 |
| 3,888,037 | 6/1975 | Warthen . | |
| 3,994,990 | 11/1976 | Foote | 260/857 TW |
| 4,178,342 | 12/1979 | Klein | 264/275 |
| 5,502,132 | 3/1996 | Sugiyama et al. | 526/247 |
| 5,887,811 | 3/1999 | Tsutumi | 242/322 |

*Primary Examiner*—Jack W. Lavinder
*Attorney, Agent, or Firm*—Charles M. Kaplan

[57] ABSTRACT

Brightly colored translucent monofilament fishing leader line that only permits light in the range of around 500 to around 750 nanometers to pass through the line may appear to glow or shine in the water. When the length of such line is within the range of about seven centimeters to about one meter, a fishing rig using the line will attract game fish to the bait or lure attached to the leader.

18 Claims, 1 Drawing Sheet

FISHING RIG AND METHOD

This application is entitled to the filing date of U.S. Provisional Application No. 60/036,982, which was filed on Jan. 30, 1997.

BACKGROUND OF THE INVENTION

This invention relates to fishing tackle, and more particularly to the use of brightly colored translucent fishing lines to attract fish to live, natural or artificial bait. The prior art teaches that fishing lines and leaders should be as close to invisible as possible so that the lines and leaders do not spook or scare game fish away from the bait. Clear transparent lines and lines colored like the water being fished have been used to hide the line from the game fish. This invention is based on the discovery that fish lines of predetermined lengths that permit the transmission there through of light rays or waves that fall only within a specific range of wave lengths can be used to attract game fish to a bait or lure.

OBJECTIVES OF THE INVENTION

Accordingly, it is an object of this invention to provide improved fishing tackle and fishing methods.

Another object is to provide brightly colored snelled hooks that have a color glow that attracts fish.

An additional object is to provide brightly colored monofilament leaders that attract fish.

Another object is to provide hooks with translucent and transparent snells having bright colors consisting essentially of chartreuse, orange, pink and lime, that appear to shine or glow in a way that attracts game fish.

Another object is to provide a method of attracting fish to a lure or bait that uses translucent monofilament fishing line to filter out light waves that do not fall within a predetermined range of wave lengths.

A further object is to use a short piece brightly colored monofilament leader line with fishing tackle, which is rugged, economical, pleasing in appearance, highly attractive to game fish, easy to use, which appears to be fluorescent under some light conditions, and which does not possess defects found in similar prior art tackle.

Other objects and advantages of the fishing tackle incorporating this invention will be found in the specification and claim and the scope of the invention will be set forth in the claim.

DESCRIPTION OF THE INVENTION

Figure 1:
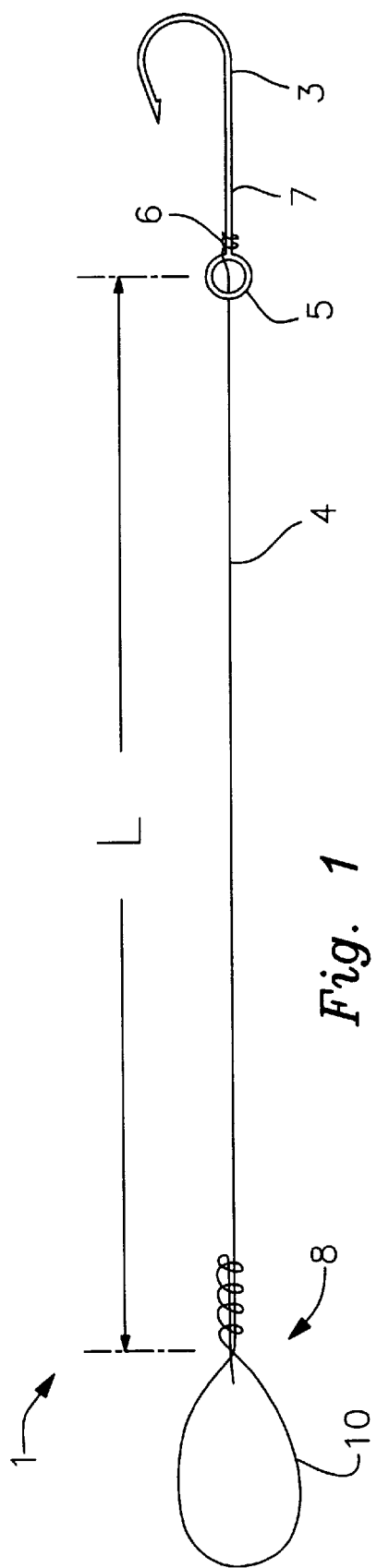
FIG. 1 is a perspective view of one embodiment of the invention.

The drawing shows fishing rigs 1 and 2 in accord with this invention. In FIG. 1, the rig 1 comprises a snelled hook 3 in which a length L of monofilament fishing leader line 4 passes through the eye 5 of the hook and is tied in a snell knot at one end 6 to the hook shank 7. The other end 8 of the line 4 is tied into a conventional snell loop 10.

Figure 2:
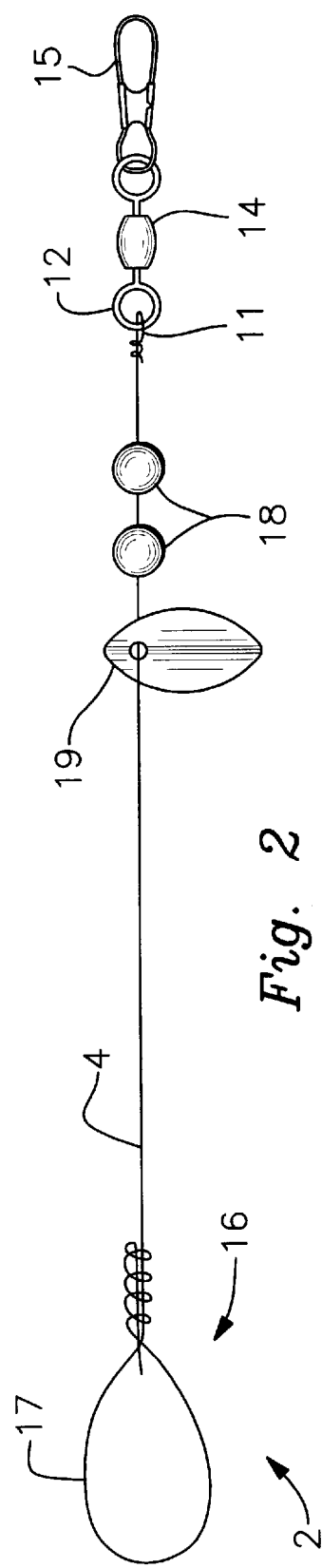
FIG. 2 is a perspective view of another embodiment of the invention.

In FIG. 2, the rig 2 also comprises the same length L of the monofilament fishing leader line 4 that has been tied at one end 11 to the eye 12 of a conventional swivel 14 that is connected to a conventional snap 15. The other end 16 of the line 4 is tied into a conventional snell loop 17. One or more beads 18 and one or more spinner blades 19 may be attached to the line 4 between its ends 11 and 15. A fish hook or a fish lure such as a spoon, spinner, jig, fly or plug may be connected to the snap 15. The snell loops 10 and 17 may be replaced by a swivel such as 14 or by a snap such as 15 with or without a swivel.

To achieve the fish attracting benefits of this invention, the fishing leader line 4 must be at least translucent, which means that the line permits light waves to pass there through but causes some diffusion of the light waves. A translucent line can also be described as semi-transparent in that objects can not be clearly seen or recognized by looking through the line. Preferably the line 4 is transparent, which is a special case of translucence and means that the diffusion of the light waves passing there through is so slight that objects can be seen clearly or recognized by looking through the line. Opaque fishing lines are not translucent. Translucent and transparent lines 4 may be made from non-fluorescent nylon and other non-fluorescent copolymer formulations for monofilament fishing lines.

When only light within a predetermined range of wave lengths passes through the monofilament leader line 4, the line often appears to glow or shine in the water depending on the amount of light in the water being fished. The wave length of the light that is permitted to pass through the line 4 should be in the range of from around 500 to around 750 nanometers. Several colors that fall within this range that appear to glow in water and attract fish are chartreuse, orange, pink and lime. These colors may even appear to be fluorescent under some light conditions, even though the material from which the line 4 is made is non-fluorescent, and this glow of color is in addition to any visible color resulting from light waves reflected by the line 4.

The length L of the fishing leader line 4 must be long enough to produce enough of a color glow to attract fish to the bait being fished; but the length L must not be so long that the color glow of the line 4 scares or repels the game fish or distracts the fish from the ends 6 and 11 where the hook, bait or lure is attached to the fishing rigs 1 and 2. The length L should be in the range from about seven centimeters to about one meter. Lengths less than about seven centimeters do not produce sufficient glow to consistently attract fish, and the glow from lengths above about one meter repels the fish. Preferably, the length L should be in the range from about fifteen to about fifty centimeters. The best game fish attracting results occur when the length L is from about twenty to about thirty centimeters.

This method of fishing involves the use of the above described non-fluorescent translucent and transparent monofilament lines to produce a glowing or shinning effect in the water of a color having a wave length in range of around 500 to around 750 nanometers by permitting only light waves in that range to pass through the lines and preventing passage there through of light waves outside the range. Using these lines as leaders having a length limited to the range of from about seven centimeters to about one meter will produce sufficient color glow to attract fish to the bait or lure at the end of such leaders, but not so much of a color glow that the fish are scared away or distracted from the bait or lure.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claim cover all such changes as fall within the true spirit and scope of the invention.

I claim:

1. A fishing rig comprising a translucent monofilament fishing leader line having a length in the range from about seven centimeters to about one meter, said translucent fishing line attracting fish to said rig by permitting light with a wave length that falls only in the range of from around 500 to around 750 nano meters to pass through said translucent fishing line so as to produce a glow of color in water.

2. The fishing rig defined in claim 1, further comprising said translucent fishing line having a snell loop tied at one of its ends.

3. The fishing rig defined in claim 2, further comprising said translucent fishing line having a snap and swivel attached to its other end.

4. The fishing rig defined in claim 3, further comprising said translucent fishing line being connected to a spinner blade and beads located between said snell loop and said swivel.

5. The fishing rig defined in claim 1, wherein said length of said translucent fishing line is in the range from about fifteen to about fifty centimeters.

6. The fishing rig defined in claim 5, wherein said length of said translucent fishing line is in the range from about twenty to about thirty centimeters.

7. The fishing rig defined in claim 1, said wave length of said light produces a color selected from the group consisting of chartreuse, orange, pink and lime.

8. The fishing rig defined in claim 1, wherein said translucent fishing line is transparent.

9. A fishing rig comprising a translucent non-fluorescent monofilament fishing leader line having a snell loop tied at one of its ends, said translucent fishing line having a length in the range from about seven centimeters to about one meter, said translucent fishing line attracting fish to said rig by permitting to pass through said translucent fishing line only light with a wave length that falls in the range of from around 500 to around 750 nanometers that produces an apparent glow in water being fished of a color selected from the group consisting of chartreuse, orange, pink and lime.

10. The fishing rig defined in claim 9, wherein said translucent fishing line is transparent.

11. The fishing rig defined in claim 9, further comprising said translucent fishing line having a snap and swivel attached to its other end.

12. The fishing rig defined in claim 11, further comprising said translucent fishing line being connected to a spinner blade and beads located between said snell loop and said swivel.

13. The fishing rig defined in claim 9, wherein said length of said translucent fishing line is in the range from about fifteen to about fifty centimeters.

14. The fishing rig defined in claim 13, wherein said length of said translucent fishing line is in the range from about twenty to about thirty centimeters.

15. The method of attracting fish to a bait being fished in water, comprising connecting said bait to a translucent monofilament fishing leader line that produces an apparent color glow in said water by permitting light with a wave length in the range only from around 500 to around 750 nanometers to pass through said translucent fishing line, preventing transmission there through of light outside of said range, and limiting the length of said translucent fishing leader line to the range of from about seven centimeters to about one meter.

16. The method of attracting fish to a bait defined in claim 15, further comprising limiting the length of said translucent fishing line to the range from about fifteen to about fifty centimeters.

17. The method of attracting fish to a bait defined in claim 16, further comprising limiting the length of said translucent fishing line to the range from about twenty to about thirty centimeters.

18. The method of attracting fish to a bait defined in claim 15, further comprising limiting the wave lengths in said range to a wave length that produces a color selected from the group consisting of chartreuse, orange, pink and lime.

* * * * *

UNITED STATES PATENT AND TRADEMARK OFFICE
CERTIFICATE OF CORRECTION

PATENT NO.  : 6,101,755

DATED       : August 15, 2000

INVENTOR(S) : Wayne Kent

It is certified that error appears in the above-identified patent and that said Letters Patent is hereby corrected as shown below:

Column 3, line 12, change "a" to ---- an apparent ---.

Signed and Sealed this

Twenty-ninth Day of May, 2001

*Attest:*

NICHOLAS P. GODICI

*Attesting Officer*     *Acting Director of the United States Patent and Trademark Office*